United States Patent
Song

(10) Patent No.: US 10,752,194 B2
(45) Date of Patent: Aug. 25, 2020

(54) BACK BEAM FOR VEHICLE HAVING CHARGE/DISCHARGE FUNCTION, METHOD OF MANUFACTURING THE SAME, AND OPERATING SYSTEM OF VEHICLE USING THE SAME

(71) Applicants: Hyundai Motor Company, Seoul (KR); Kia Motors Corporation, Seoul (KR)

(72) Inventor: Won Ki Song, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 108 days.

(21) Appl. No.: 16/167,324

(22) Filed: Oct. 22, 2018

(65) Prior Publication Data
US 2019/0351853 A1 Nov. 21, 2019

(30) Foreign Application Priority Data
May 17, 2018 (KR) .................. 10-2018-0056393

(51) Int. Cl.
*B60R 19/02* (2006.01)
*B60R 19/18* (2006.01)
*B60R 19/04* (2006.01)
*B60R 19/48* (2006.01)
*B60R 21/0136* (2006.01)
*B60R 19/03* (2006.01)

(52) U.S. Cl.
CPC .............. *B60R 19/18* (2013.01); *B60R 19/03* (2013.01); *B60R 19/04* (2013.01); *B60R 19/483* (2013.01); *B60R 21/0136* (2013.01); *B60R 2019/1853* (2013.01)

(58) Field of Classification Search
CPC ......... B60R 19/18; B60R 19/03; B60R 19/04; B60R 19/483; B60R 21/0136; B60R 2019/1853
See application file for complete search history.

(56) References Cited

U.S. PATENT DOCUMENTS

| | | | |
|---|---|---|---|
| 2011/0127798 A1* | 6/2011 | Lee .................. | B60R 19/18 296/187.04 |
| 2012/0104778 A1* | 5/2012 | Mana .................. | B60R 19/18 293/133 |

(Continued)

FOREIGN PATENT DOCUMENTS

KR 10-2015-0072178 A 6/2015

*Primary Examiner* — Lori L Lyjak
(74) *Attorney, Agent, or Firm* — Morgan, Lewis & Bockius LLP

(57) ABSTRACT

A back beam for a vehicle having a charge and discharge function utilizing carbon fiber used as a reinforcing material in a back beam of a vehicle, may include a reinforced negative electrode portion formed of carbon fiber and formed to extend in the width direction of the vehicle, a positive electrode portion disposed opposite to at least a portion of the reinforced negative electrode portion, a solid electrolyte portion disposed between the reinforced negative electrode portion and the positive electrode portion to be in contact with the reinforced negative electrode portion and the positive electrode portion, and a molding portion formed of resin and surrounding the reinforced negative electrode portion, the positive electrode portion and the solid electrolyte portion.

7 Claims, 7 Drawing Sheets

(56) References Cited

U.S. PATENT DOCUMENTS

| | | | | |
|---|---|---|---|---|
| 2012/0135655 A1* | 5/2012 | Choi | ........................ | B60R 19/03 |
| | | | | 442/179 |
| 2012/0306222 A1* | 12/2012 | Choi | ........................ | B60R 19/03 |
| | | | | 293/120 |
| 2013/0113226 A1* | 5/2013 | Bobba | ...................... | B60R 19/18 |
| | | | | 293/133 |
| 2013/0181463 A1* | 7/2013 | Yamaguchi | ............. | B60R 19/04 |
| | | | | 293/120 |
| 2015/0175107 A1* | 6/2015 | Yoon | ........................ | B60R 19/18 |
| | | | | 293/120 |

* cited by examiner

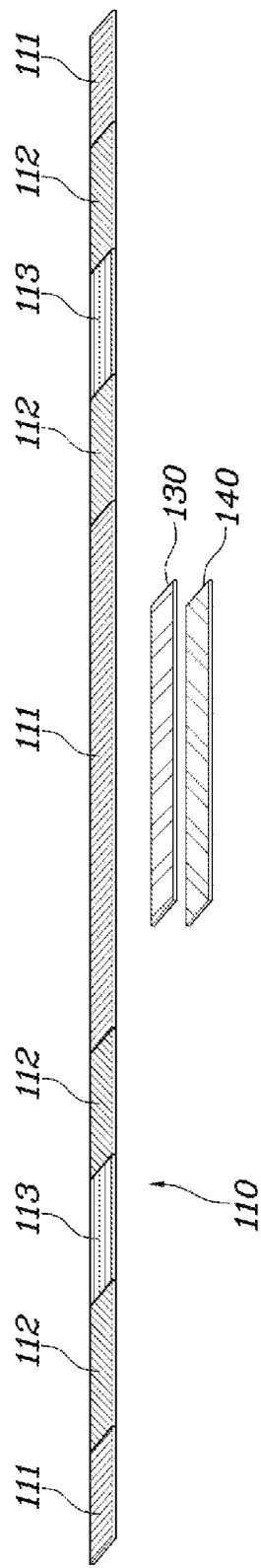

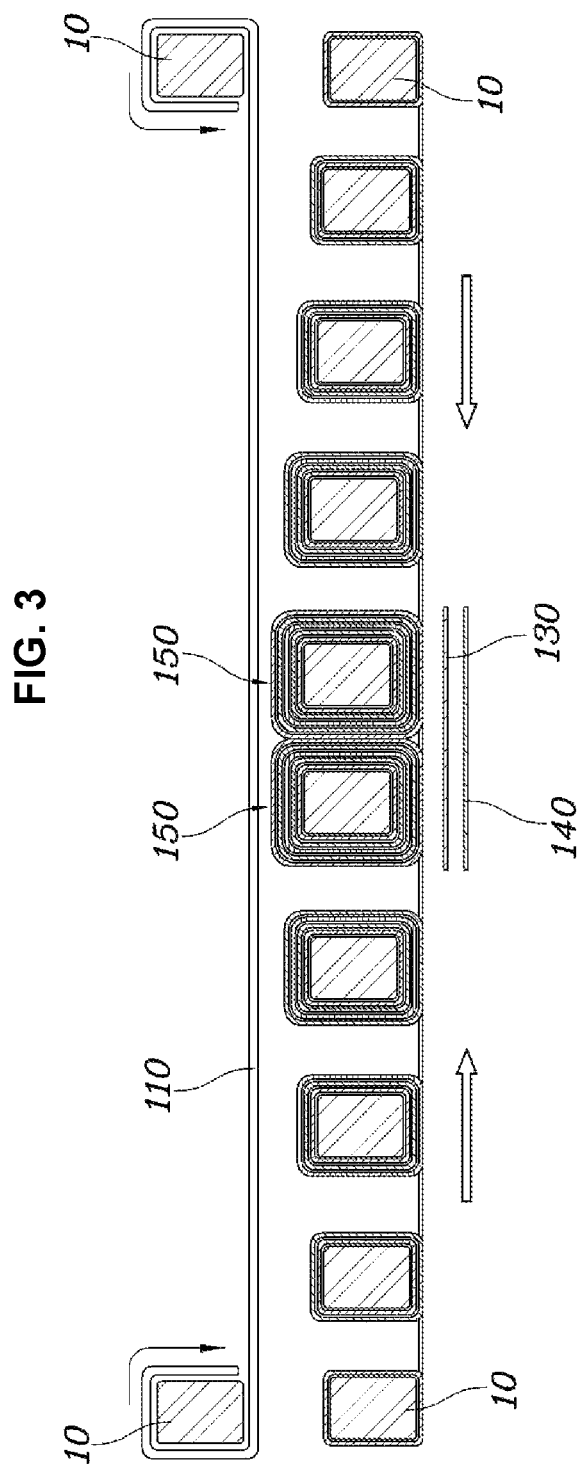

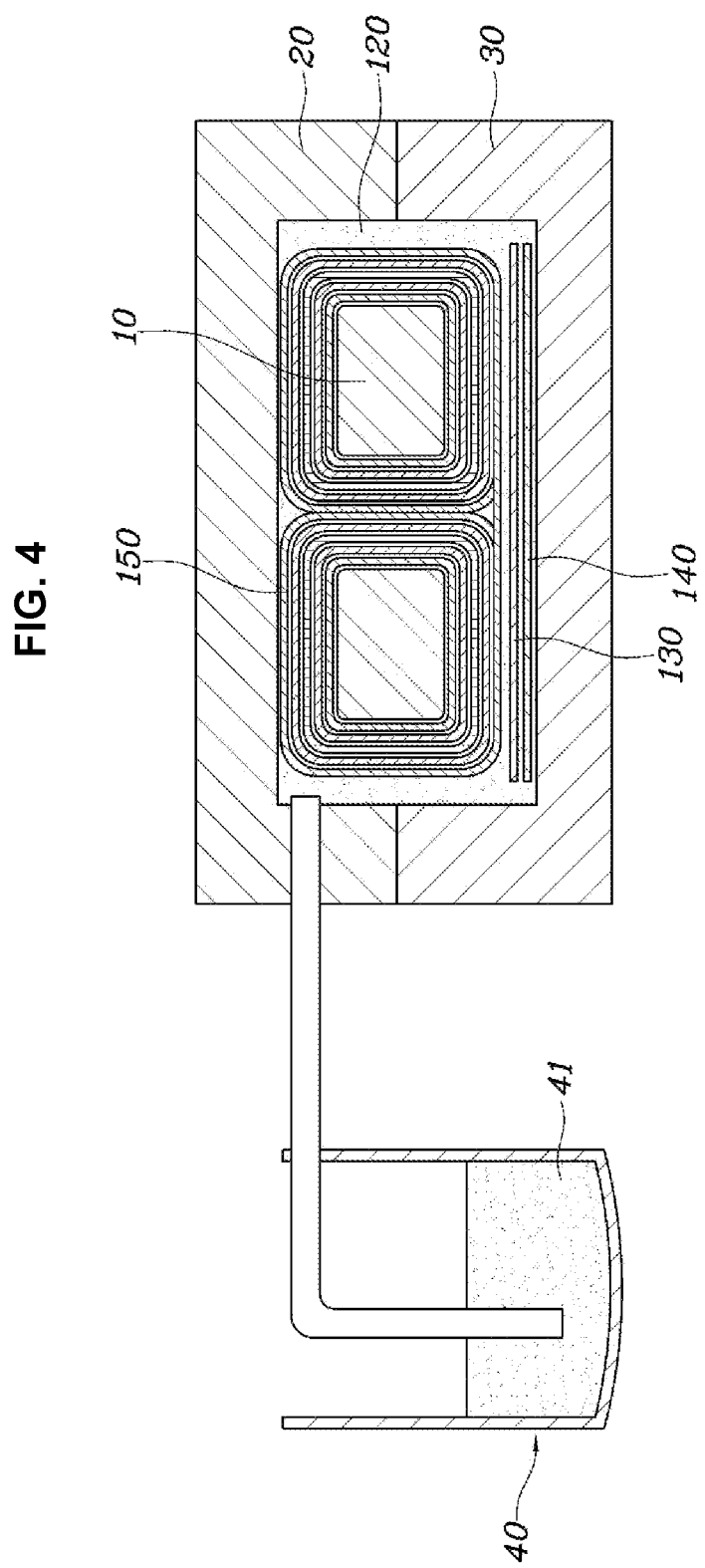

BACK BEAM FOR VEHICLE HAVING CHARGE/DISCHARGE FUNCTION, METHOD OF MANUFACTURING THE SAME, AND OPERATING SYSTEM OF VEHICLE USING THE SAME

CROSS-REFERENCE TO RELATED APPLICATION

The present application claims priority to Korean Patent Application No. 10-2018-0056393, filed on May 17, 2018 in the Korean Intellectual Property Office, the entire contents of which is incorporated herein for all purposes by this reference.

BACKGROUND OF THE INVENTION

Field of the Invention

The present invention relates to a back beam for a vehicle having a charge/discharge function, a method of manufacturing the same, and an operating system of a vehicle using the same, and more particularly to a back beam for a vehicle having a charge/discharge function utilizing carbon fiber used as a reinforcing material in a back beam of a vehicle, a method of manufacturing the same, and an operating system of a vehicle using the same.

Description of Related Art

Generally, a vehicle body structure and various parts of a vehicle are typically manufactured using a steel material. Recently, a composite material such as a fiber-reinforced resin composite material has been used as a substitute for a steel material to realize a lightweight vehicle body structure and consequently to improve fuel efficiency.

In general, a fiber-reinforced resin composite material may include a reinforcing material, which carries a load applied to the corresponding element, and a base material, which is combined with the reinforcing material to realize the overall shape of the element and to transmit the load applied to the element to the reinforcing material. As the reinforcing material, a fibrous reinforcing material, such as, for example, carbon fiber, glass fiber or aramid fiber, is commonly used. As the base material, a resin-type base material, such as thermosetting resin including, for example, phenol resin and epoxy resin, or thermoplastic resin including, for example, polyvinyl chloride (PVC) resin, polyethylene (PE) resin and polypropylene (PP) resin, is commonly used.

Many parts of a vehicle are electronic devices that are operated by power supplied from a battery. Recently, due to an increase in the number of electronic devices, research on increasing the capacity of a battery in a vehicle has been continuously conducted.

The present invention has been made in view of the fact that carbon fiber used as a reinforcing material of a fiber-reinforced resin composite material may be utilized as a negative electrode forming a secondary battery. Thus, the invention proposes a back beam for a vehicle, which is capable of performing a charge/discharge function utilizing a reinforcing material used for weight reduction and strength reinforcement of a vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a back beam for a vehicle having a charge/discharge function utilizing carbon fiber, used as a reinforcing material in a back beam of a vehicle, as a negative electrode, a method of manufacturing the same, and an operating system of a vehicle using the same.

In accordance with an aspect of the present invention, the above and other objects may be accomplished by the provision of a back beam for a vehicle having a charge/discharge function including a reinforced negative electrode portion formed of carbon fiber, the reinforced negative electrode portion being formed to extend in the width direction of a vehicle, a positive electrode portion disposed opposite at least a portion of the reinforced negative electrode portion, a solid electrolyte portion disposed between the reinforced negative electrode portion and the positive electrode portion to be in contact with the reinforced negative electrode portion and the positive electrode portion, and a molding portion formed of resin, the molding portion surrounding the reinforced negative electrode portion, the positive electrode portion and the solid electrolyte portion.

The reinforced negative electrode portion may be implemented by manufacturing a multi-sheet such that reinforced fiber sheets, each including carbon fibers disposed in a direction different from directions in which the carbon fibers of the other reinforced fiber sheets are disposed, are alternately and continuously disposed in the longitudinal direction thereof and are connected to each other, and by rolling the multi-sheet in the shape of a pipe having a multi-layer structure.

The reinforced negative electrode portion may include a hollow hole formed therein in the width direction of the vehicle.

The reinforced negative electrode portion and the positive electrode portion may be selectively connectable to an alternator or an electronic device of the vehicle by a switch. While the reinforced negative electrode portion and the positive electrode portion are electrically connected to the alternator, a charging operation may be performed through the solid electrolyte portion. While the reinforced negative electrode portion and the positive electrode portion are electrically connected to the electronic device, power generated by a discharging operation performed through the solid electrolyte portion may be supplied to the electronic device.

The back beam may further include a resistive sensor connected to the reinforced negative electrode and the positive electrode to detect a resistance caused by the reinforced negative electrode portion, the positive electrode portion and the solid electrolyte portion. A determination may be made as to whether a collision has occurred based on a change in the resistance detected by the resistive sensor.

In accordance with another aspect of the present invention, there is provided a method of manufacturing a back beam for a vehicle, the method including preparing a reinforced negative electrode portion using carbon fiber to extend in the width direction of a vehicle, preparing a positive electrode portion using a positive electrode active material, preparing a solid electrolyte portion using a solid-state electrolyte, arranging the solid electrolyte portion between the reinforced negative electrode portion and the positive electrode portion to be in contact with the reinforced negative electrode portion and the positive electrode portion, and forming a molding portion by impregnating resin to surround the reinforced negative electrode portion, the positive electrode portion and the solid electrolyte portion.

The preparing the reinforced negative electrode portion may include preparing a multi-sheet in which reinforced fiber sheets, each including carbon fibers disposed in a direction different from directions in which the carbon fibers of the other reinforced fiber sheets are disposed, are alternately disposed in the longitudinal direction thereof and are connected to each other, and forming the reinforced negative electrode portion in the shape of a pipe having a multi-layer structure by rolling the multi-sheet.

The preparing the multi-sheet may include alternately and continuously arranging the reinforced fiber sheets in the same plane in the longitudinal direction thereof and connecting the reinforced fiber sheets to each other.

The forming the reinforced negative electrode portion may include winding the multi-sheet around the external circumferential surface of at least one internal mold rotating about the rotation axis thereof to form multiple layers.

In the preparing the multi-sheet, the length of each of the reinforced fiber sheets may be determined corresponding to the length of the external circumferential surface of the internal mold used in the forming the reinforced negative electrode portion.

The forming the reinforced negative electrode portion may include preparing two internal molds, arranging the two internal molds such that each of the two internal molds is located at a respective one of both end portions of the multi-sheet, and rolling the two internal molds toward the center of the multi-sheet so that the multi-sheet is wound around the external circumferential surface of each of the two internal molds to have a multi-layer structure.

The forming the molding portion may include disposing the reinforced negative electrode portion, the positive electrode portion and the solid electrolyte portion inside a cavity, formed by engaging an upper mold and a lower mold with each other, such that the solid electrolyte portion is located between the reinforced negative electrode portion and the positive electrode portion to be in contact with the reinforced negative electrode portion and the positive electrode portion, and injecting resin into the cavity and curing the resin.

In accordance with a further aspect of the present invention, there is provided an operating system of a vehicle including a reinforced negative electrode portion formed of carbon fiber, a positive electrode portion disposed opposite at least a portion of the reinforced negative electrode portion, a solid electrolyte portion disposed between the reinforced negative electrode portion and the positive electrode portion to be in contact with the reinforced negative electrode portion and the positive electrode portion, a molding portion formed of resin, the molding portion surrounding the reinforced negative electrode portion, the positive electrode portion and the solid electrolyte portion, an alternator for implementing a charging operation through the solid electrolyte portion when electrically connected to the reinforced negative electrode portion and the positive electrode portion, an electronic device configured to be operated by power generated by a discharging operation through the solid electrolyte portion when electrically connected to the reinforced negative electrode portion and the positive electrode portion, and a switch connected to the reinforced negative electrode unit, the alternator and the electronic device to selectively connect the reinforced negative electrode portion to the alternator or the electronic device.

The operating system may further include a resistive sensor connected to the reinforced negative electrode portion and the positive electrode portion to detect a resistance caused by the reinforced negative electrode portion, the positive electrode portion and the solid electrolyte portion, a controller for detecting a change in the resistance detected by the resistive sensor and determining whether a collision has occurred based on the change in the resistance, and at least one airbag configured to be operated in a response to an operation signal which is generated when the controller determines that a collision has occurred.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2, FIG. 3 and FIG. 4 are views showing a method of manufacturing a back beam for a vehicle having a charge/discharge function according to an exemplary embodiment of the present invention;

Figure 1A:
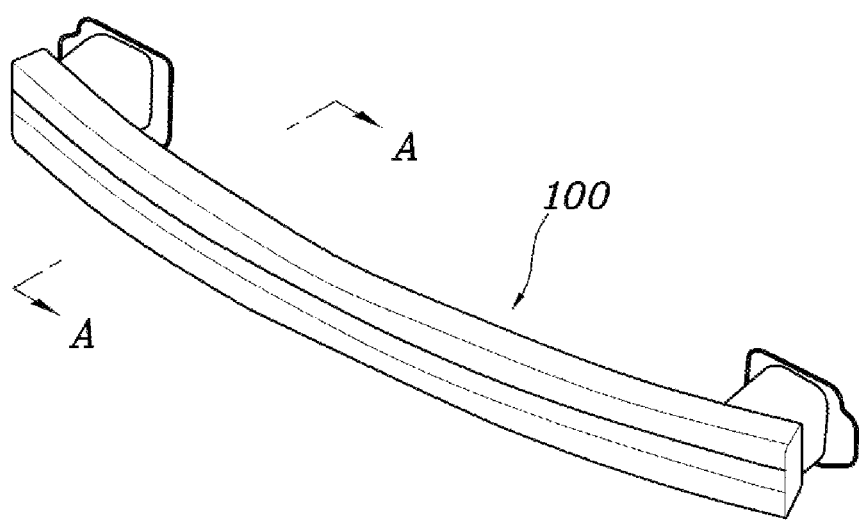
FIG. 1A and FIG. 1B are views showing a back beam for a vehicle having a charge/discharge function according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

The present invention will now be described more fully with reference to the accompanying drawings, in which exemplary embodiments of the invention are shown. The present invention may, however, be embodied in various forms, and may not be construed as being limited to the exemplary embodiments set forth herein; rather, these embodiments are provided so that the present disclosure will be thorough and complete and will fully convey the scope of the invention to those skilled in the art. In the drawings, the same or similar elements are denoted by the same reference numerals.

Figure 1B:
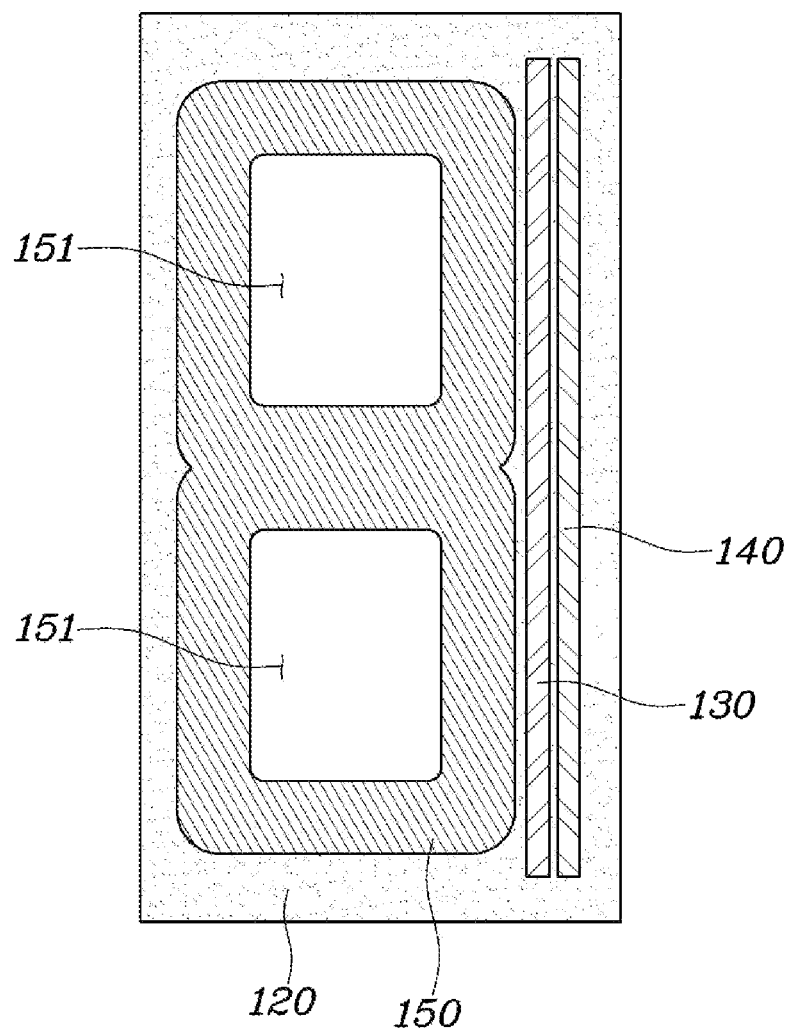

FIG. 1A and FIG. 1B are views showing a back beam for a vehicle having a charge/discharge function according to an exemplary embodiment of the present invention. FIG. 2, FIG. 3 and FIG. 4 are views showing a method of manufacturing a back beam for a vehicle having a charge/discharge function according to an exemplary embodiment of the present invention.

As illustrated, a back beam 100 for a vehicle having a charge/discharge function according to an exemplary embodiment of the present invention includes a reinforced negative electrode portion 150, which is formed of carbon fiber and is formed to extend in the width direction of the vehicle, a positive electrode portion 140, which is disposed opposite at least a portion of the reinforced negative electrode portion 150, a solid electrolyte portion 130, which is disposed between the reinforced negative electrode portion 150 and the positive electrode portion 140 to be in contact with the reinforced negative electrode portion 150 and the positive electrode portion 140, and a molding portion 120, which is formed of resin 41 and surrounds the reinforced negative electrode portion 150, the positive electrode portion 140 and the solid electrolyte portion 130.

The reinforced negative electrode portion 150 is a reinforcement element, which is inserted into the molding portion 120 to increase the rigidity of the back beam 100. In the exemplary embodiment of the present invention, the reinforced negative electrode portion 150 also functions as a negative electrode for performing a charge/discharge function. To the present end, the reinforced negative electrode portion 150 may be implemented by carbon fiber which is formed of a carbon material that facilitates the oxidation and reduction of lithium ions.

At the instant time, the reinforced negative electrode portion 150 may be formed by laminating a plurality of reinforced fiber sheets 111, 112 and 113, each including carbon fibers disposed in a direction different from the directions in which the carbon fibers of the other reinforced fiber sheets are disposed to increase rigidity. For example, the reinforced negative electrode portion 150 may be implemented by manufacturing a multi-sheet 110 such that the reinforced fiber sheets 111, 112 and 113, each including carbon fibers disposed in a direction different from the directions in which the carbon fibers of the other sheets are disposed, are alternately and continuously disposed in the longitudinal direction of the multi-sheet 110 and are connected to each other, and by rolling the multi-sheet 110 in the shape of a pipe that has a multi-layer structure. In other words, the reinforced negative electrode portion 150 is formed by rolling the reinforced fiber sheets 111, 112 and 113. Accordingly, a hollow hole 151 is formed in the reinforced negative electrode portion 150 in the width direction of the vehicle. The present formation of the hollow hole 151 in the reinforced negative electrode portion 150 can reduce the weight of the back beam 100.

The positive electrode portion 140 is configured as a positive electrode for performing a charge/discharge function. The positive electrode portion 140 may include a positive electrode active material used for a positive electrode in a conventional secondary battery. For example, the positive electrode portion 140 may include a lithium metal oxide.

At the instant time, the positive electrode portion 140, which is disposed opposite to the reinforced negative electrode portion 150, may extend over the entire length of the region in which the reinforced negative electrode portion 150 extends. However, the present invention is not limited thereto. Alternatively, the positive electrode portion 140 may be formed locally at specific positions in the width direction of the vehicle.

The solid electrolyte portion 130 is configured as an all-solid-state separator for performing a charge/discharge function. The solid electrolyte portion 130 may be implemented by a material used as a solid-state electrolyte, i.e., a solid electrolyte, in a conventional secondary battery.

The molding portion 120 is formed by molding resin to surround the reinforced negative electrode portion 150, the positive electrode portion 140 and the solid electrolyte portion 130 and by curing the resin. At the instant time, the external appearance of the molding portion 120 may be formed to correspond to the overall shape of the back beam 100 for a vehicle.

As the resin 41 forming the molding portion 120, various resin materials configured for realizing a composite material may be selectively used. For example, thermosetting resin including, for example, phenol resin and epoxy resin, or thermoplastic resin including, for example, polyvinyl chloride (PVC) resin, polyethylene (PE) resin and polypropylene (PP) resin, may be used.

Next, a description will be provided of a method of manufacturing the above-described back beam for a vehicle having a charge/discharge function according to an exemplary embodiment of the present invention.

As illustrated, a method of manufacturing the above-described back beam for a vehicle having a charge/discharge function according to an exemplary embodiment of the present invention includes the steps of preparing the reinforced negative electrode portion 150 using carbon fiber to extend in the width direction of the vehicle, preparing the positive electrode portion 140 using a positive electrode active material, preparing a solid electrolyte portion 130 using a solid-state electrolyte, arranging the solid electrolyte portion 130 between the reinforced negative electrode portion 150 and the positive electrode portion 140 to be in contact with the reinforced negative electrode portion 150 and the positive electrode portion 140, and forming the molding portion 120 by impregnating resin to surround the reinforced negative electrode portion 150, the positive electrode portion 140 and the solid electrolyte portion 130.

The step of preparing the reinforced negative electrode portion 150 includes the steps of preparing the multi-sheet 110 in which the reinforced fiber sheets 111, 112 and 113, each including carbon fibers disposed in a direction different from the directions in which the carbon fibers of the other sheets are disposed, are alternately and continuously disposed in the longitudinal direction thereof and are connected to each other, and forming the reinforced negative electrode portion 150 in the shape of a pipe that has a multi-layer structure by rolling the multi-sheet 110.

The step of preparing the multi-sheet 110 includes preparing a plurality of reinforced fiber sheets 111, 112 and 113, each including carbon fibers woven to be disposed in a direction different from the directions in which the carbon fibers of the other sheets are disposed (for example, the carbon fibers of each of the reinforced fiber sheets 111, 112 and 113 are uniformly disposed at an angle selected from the group including 0°, ±45° and ±90°), and alternately and continuously arranging the reinforced fiber sheets 111, 112 and 113 in the same plane in the longitudinal direction thereof and connecting the same to each other.

At the instant time, the concrete method of preparing the multi-sheet 110 may be implemented as various methods.

For example, to prepare the multi-sheet 110, a first reinforced fiber sheet 111, in which reinforced fibers are woven at an angle of 0°, a second reinforced fiber sheet 112, in which reinforced fibers are woven at an angle of 45°, and a third reinforced fiber sheet 113, in which reinforced fibers are woven at an angle of 90°, are separately prepared. Subsequently, the first reinforced fiber sheet 111, the second reinforced fiber sheet 112 and the third reinforced fiber sheet 113 are alternately and continuously disposed in the longitudinal direction thereof, and are connected to each other. Of course, the angles at which the reinforced fibers of the first to third reinforced fiber sheets 111, 112 and 113 are disposed are not limited to the aforementioned angles, but may be various other angles. The number and arrangement order of the reinforced fiber sheets may also be variously modified.

Furthermore, as another method of preparing the multi-sheet 110, Tailored Fiber Placement (TFP) equipment may be used. Using the TFP equipment, reinforced fibers are successively woven to be disposed in a different direction in each region. At the instant time, the weaving process is continuously performed while changing the weaving direction for each region to provide a different fiber arrangement pattern for each region. For example, in the initial stage of the weaving process, reinforced fibers are woven at an angle of 0° to form the first reinforced fiber sheet 111. Subsequently, reinforced fibers are woven at an angle of 45° to form the second reinforced fiber sheet 112. Subsequently, reinforced fibers are woven at an angle of 90° to form the third reinforced fiber sheet 113. In the present manner, it is possible to provide a multi-sheet 110 which continuously extends with a different fiber arrangement pattern (direction) for each region. In the instant case, the reinforced fibers of the first to third reinforced fiber sheets 111, 112 and 113 are not woven only at the aforementioned angles, but may be woven at various other angles.

The step of forming the reinforced negative electrode portion 150 in the shape of a pipe that has a multi-layer structure by rolling the multi-sheet 110 may be performed using an internal mold 10, which is rotated about a rotation axis thereof. At the instant time, internal molds 10 having various shapes corresponding to the final shapes of products may be selectively used.

For example, two internal molds 10 are provided such that each of the internal molds 10 is located at a respective one of both end portions of the multi-sheet 110, and are then rolled toward the center of the multi-sheet 110, winding the multi-sheet 110 around the external circumferential surface of each of the internal molds 10 to have a multi-layer structure. As described above, the multi-sheet 110 is formed by connecting the first to third reinforced fiber sheets 111, 112 and 113, which are alternately and continuously disposed in the longitudinal direction thereof and in each of which reinforced fibers are woven in a uniform direction thereof. Thus, when the internal mold 10 is rolled, the first to third reinforced fiber sheets 111, 112 and 113, which have different fiber arrangement directions from each other, are sequentially wound around the internal mold 10. Therefore, it is possible to determine the arrangement direction of the carbon fibers, which are disposed in each layer of the reinforced negative electrode portion 150, by adjusting the lengths of the reinforced fiber sheets 111, 112 and 113 depending on the length of the external circumferential surface of the internal mold 10.

The step of preparing the positive electrode portion 140 using the positive electrode active material and the step of preparing the solid electrolyte portion 130 using the solid-state electrolyte may be implemented using methods of preparing a positive electrode and of preparing a solid electrolyte in a conventional secondary battery.

At the instant time, the positive electrode portion 140 and the solid electrolyte portion 130 may be formed to extend over the entire length of the region in which the reinforced negative electrode portion 150 extends. However, the positive electrode portion 140 and the solid electrolyte portion 130 may be formed locally at specific positions in the width direction of the vehicle. Thus, the sizes and shapes of the positive electrode portion 140 and the solid electrolyte portion 130 may be variously modified.

The step of forming the molding portion 120 includes the steps of impregnating the resin 41 to surround the reinforced negative electrode portion 150, the positive electrode portion 140 and the solid electrolyte portion 130 and curing the resin 41 to form a final or intermediate molded portion.

At the instant time, as the resin 41, various resin materials configured for realizing a composite material may be selectively used. For example, thermosetting resin including, for example, phenol resin and epoxy resin, or thermoplastic resin including, for example, polyvinyl chloride (PVC) resin, polyethylene (PE) resin and polypropylene (PP) resin, may be used.

Furthermore, the method of impregnating the resin 41 may be implemented by various methods. For example, as shown in FIG. 4, the reinforced negative electrode portion 150, the positive electrode portion 140 and the solid electrolyte portion 130, which are prepared in the above-described manner, are disposed in a cavity formed by engaging an upper mold 20 and a lower mold 30. At the instant time, the solid electrolyte portion 130 is disposed between the reinforced negative electrode portion 150 and the positive electrode portion 140 to be in contact with the reinforced negative electrode portion 150 and the positive electrode portion 140. Subsequently, the resin 41 is injected into the cavity through a resin supply device 40 and cured. When the resin 41 is completely cured, the molded product is removed from the upper mold 20 and the lower mold 30, and the internal mold 10 is removed from the internal of the reinforced negative electrode portion 150. At the instant time, the molded product is formed in a shape corresponding to the shape of the cavity, and is post-processed to be used as the back beam 100.

At the instant time, it is possible to determine whether to form the hollow hole 151 in the reinforced negative electrode portion 150 by adjusting the time at which to remove the internal mold 10 from the reinforced negative electrode portion 150. For example, in the case in which the hollow hole 151 is not formed, after the reinforced negative electrode portion 150 is prepared using the internal mold 10, the internal mold 10 is removed from the reinforced negative electrode portion 150 prior to the impregnation of the resin 41, and the resin 41 is subsequently impregnated, with the result that the space formed in the reinforced negative electrode portion 150 by the removal of the internal mold 10 therefrom is filled with the resin 41. Accordingly, it is possible to prevent the hollow hole 151 from being formed in the reinforced negative electrode portion 150.

Next, an operating system of a vehicle for utilizing the back beam for a vehicle having a charge/discharge function, which is manufactured as described above, will be described.

Figure 5A:
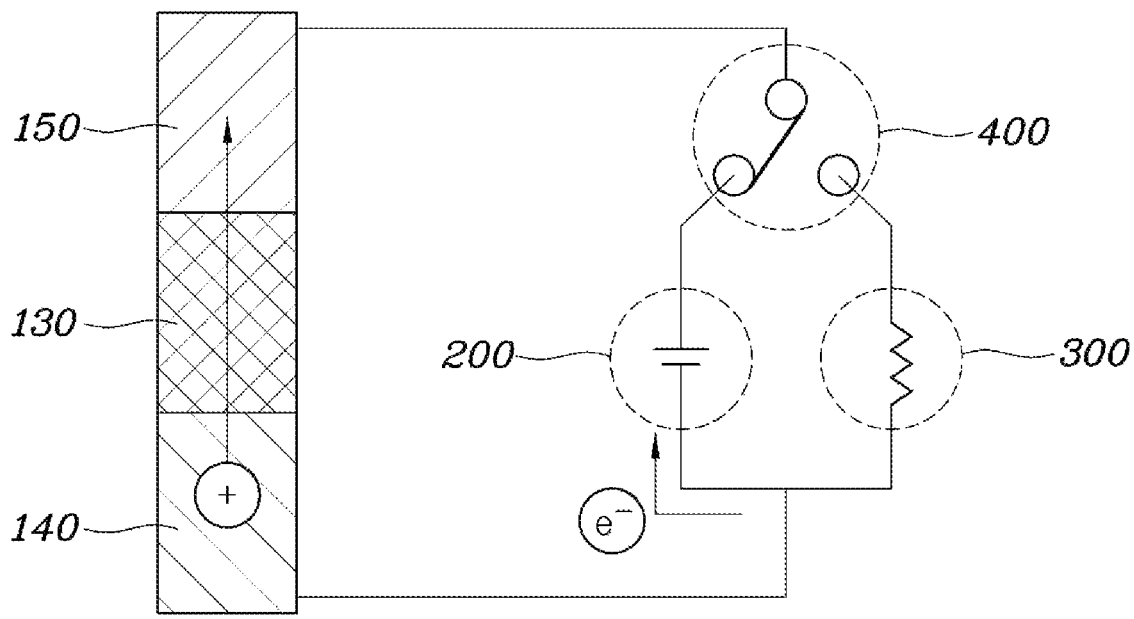
FIG. 5A and FIG. 5B are views showing an operating system of a vehicle using a back beam for a vehicle having a charge/discharge function according to an exemplary embodiment of the present invention.
Figure 5B:
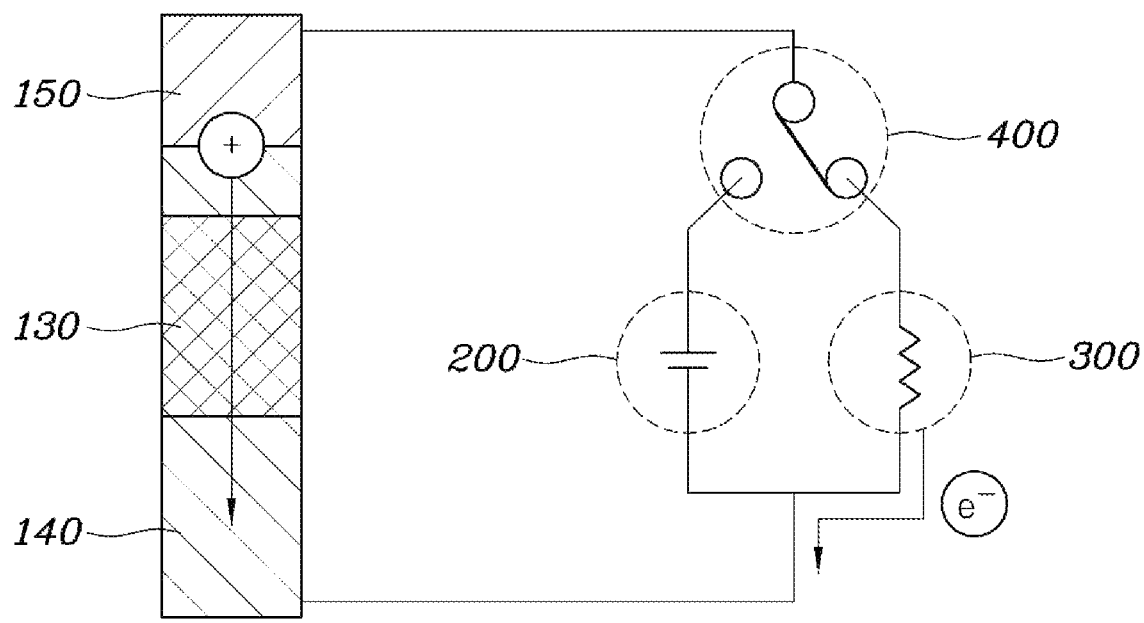

FIG. 5A and FIG. 5B are views showing an operating system of a vehicle using a back beam for a vehicle having a charge/discharge function according to an exemplary embodiment of the present invention.

To perform a charge/discharge function utilizing the above-described back beam for a vehicle, the reinforced negative electrode portion 150, the positive electrode portion 140 and the solid electrolyte portion 130, which form the back beam, are selectively connectable to an alternator 200 or an electronic device 300 of the vehicle by a switch 400. While the above constituent components of the back beam are electrically connected to the alternator 200 of the vehicle, a charging operation is performed through the solid electrolyte portion 130. While the above constituent components of the back beam are electrically connected to the electronic device 300 of the vehicle, power generated by a discharging operation performed through the solid electrolyte portion 130 is supplied to the electronic device 300 of the vehicle.

To the present end, in addition to the reinforced negative electrode portion 150, the positive electrode portion 140 and the solid electrolyte portion 130, which form the back beam 100, the operating system of a vehicle may include an alternator 200 for implementing a charging operation through the solid electrolyte portion 130 when electrically connected to the reinforced negative electrode portion 150 and the positive electrode portion 140, an electronic device 300 configured to be operated by power generated by a discharging operation through the solid electrolyte portion 130 when electrically connected to the reinforced negative electrode portion 150 and the positive electrode portion 140, and a switch 400 connected to the reinforced negative electrode device 150, the alternator 200 and the electronic device 300 to selectively connect the reinforced negative electrode portion 150 to the alternator 200 or the electronic device 300.

Here, the electronic device 300 is a component which is provided in a vehicle and is operated by power supplied thereto. For example, the electronic device 300 may include various lamps, such as an interior lamp provided in the internal of a vehicle.

As shown in FIG. 5A, while the back beam 100 is operated in a charge mode, the reinforced negative electrode portion 150 and the positive electrode portion 140 are electrically connected to the alternator 200 by the switch 400. At the instant time, lithium is ionized in the positive electrode portion 140 by electrical energy supplied from the alternator 200. The lithium ions are moved to the reinforced negative electrode portion 150 through the solid electrolyte portion 130 and are combined with electrons of the reinforced negative electrode portion 150 and stabilized.

On the other hand, as shown in FIG. 5B, while the back beam 100 is operated in a discharge mode, the reinforced negative electrode portion 150 and the positive electrode portion 140 are electrically connected to the electronic device 300 by the switch 400. At the instant time, lithium ions and electrons are separated from each other in the reinforced negative electrode portion 150. The electrons are supplied to the electronic device 300 to operate the same. The lithium ions are moved to the positive electrode portion 140 through the solid electrolyte portion 130, and are combined with electrons of the positive electrode portion 140 and stabilized.

The operating system of a vehicle for utilizing the back beam 100 for a vehicle having a charge/discharge function according to an exemplary embodiment of the present invention may determine whether a collision has occurred by detecting a change in the resistance caused by deformation of the reinforced negative electrode portion 150, the positive electrode portion 140 and the solid electrolyte portion 130, which is caused by a vehicle collision. Furthermore, the operating system may operate airbags 700a, 700b and 700c based on the detected change in the resistance, securing the safety of occupants of the vehicle.

Figure 6:
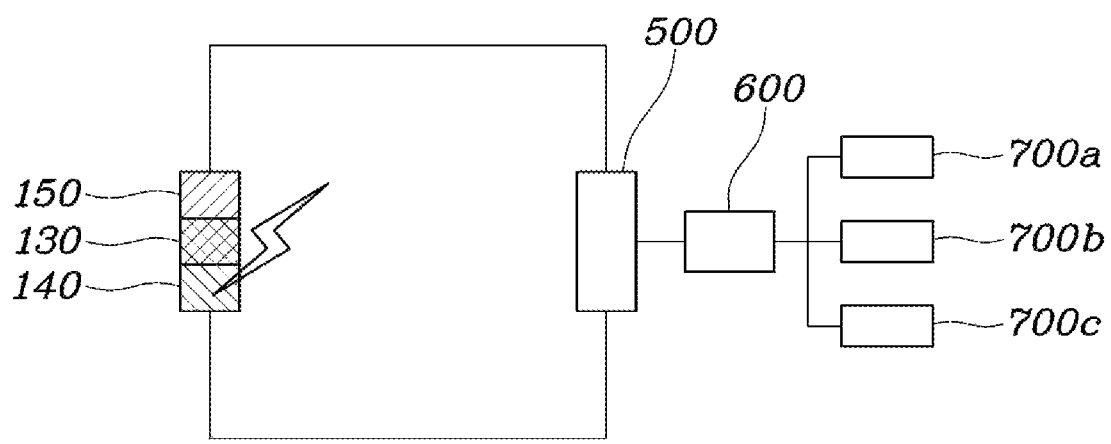
FIG. 6 is a view showing an operating system of a vehicle using a back beam for a vehicle having a charge/discharge function according to various exemplary embodiments of the present invention.

FIG. 6 is a view showing an operating system of a vehicle using a back beam for a vehicle having a charge/discharge function according to various exemplary embodiments of the present invention.

To perform a charge/discharge function utilizing the above-described back beam 100 for a vehicle, the reinforced negative electrode portion 150, the positive electrode portion 140 and the solid electrolyte portion 130, which form the back beam 100, are connected to a resistive sensor 500. The operating system detects a change in the resistance detected by the resistive sensor 500 and determines whether a collision has occurred based on the change in the resistance.

To the present end, in addition to the reinforced negative electrode portion 150, the positive electrode portion 140 and the solid electrolyte portion 130, which form the back beam 100, the operating system of a vehicle may include a resistive sensor 500 connected to the reinforced negative electrode portion 150 and the positive electrode portion 140 to detect a resistance, a controller 600 for detecting a change in the resistance detected by the resistive sensor 500 and determining whether a collision has occurred based on the change in the resistance, and at least one airbag apparatus 700a, 700b and 700c configured to be operated in a response to an operation signal which is generated when the controller 600 determines that a collision has occurred.

In an exemplary embodiment of the present invention, the at least one airbag apparatus 700a, 700b and 700c may include an actuator controlled by the controller 600 to generate gas to supply the gas in the air bag of the at least one airbag apparatus 700a, 700b and 700c according to an operation signal of the controller 600.

Since the structure of the at least one airbag apparatus 700a, 700b and 700c is generally known, the detailed structure is omitted.

As shown in FIG. 6, in the case in which at least one of the reinforced negative electrode portion 150, the positive electrode portion 140 or the solid electrolyte portion 130 is damaged by a collision, the resistance changes due to the damage, and the present change in resistance is detected by the resistive sensor 500 in real time.

Using the change in the resistance detected by the resistive sensor 500, the controller 600 determines that a collision has occurred at the damaged portion where the resistance has changed, and provides an operation signal to an airbag apparatus 700a, 700b and 700c corresponding to the damaged portion so that the airbag apparatus 700a, 700b and 700c is immediately operated, ensuring the safety of occupants of the vehicle.

As is apparent from the above description, according to the exemplary embodiment of the present invention, carbon fiber used to increase the rigidity of a back beam for a vehicle is also utilized as a negative electrode of a secondary battery, and elements that serve as an all-solid-state electrolyte and a positive electrode are mounted in the back beam, whereby the back beam for a vehicle is configured for performing the function of a chargeable/dischargeable secondary battery.

Furthermore, when the elements that are mounted in the back beam to serve as a negative electrode, a positive electrode and an all-solid-state electrolyte are damaged due to a vehicle collision, an operating system of a vehicle according to the exemplary embodiment of the present invention is configured for detecting a collision by measuring a change in the resistance due to the damage through electrical connection with the above elements mounted in the back beam, and is configured for operating an airbag corresponding to the damaged portion in a response to the collision signal.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A back beam for a vehicle having a charge and discharge function, the back beam comprising:
    a reinforced negative electrode portion formed of carbon fiber, the reinforced negative electrode portion being formed to extend in a width direction of the vehicle;
    a positive electrode portion disposed opposite to at least a portion of the reinforced negative electrode portion;
    a solid electrolyte portion disposed between the reinforced negative electrode portion and the positive electrode portion and being in contact with the reinforced negative electrode portion and the positive electrode portion; and
    a molding portion formed of resin, the molding portion surrounding the reinforced negative electrode portion, the positive electrode portion and the solid electrolyte portion.

2. The back beam according to claim 1, wherein the reinforced negative electrode portion is implemented by manufacturing a multi-sheet such that reinforced fiber sheets, each including carbon fibers disposed in a direction different from directions in which the carbon fibers of other reinforced fiber sheets are disposed, are alternately and continuously disposed in a longitudinal direction thereof and are connected to each other, and by rolling the multi-sheet in a shape of a pipe having a multi-layer structure.

3. The back beam according to claim 2, wherein a first distal end of the multi-sheet is rolled in a first direction and a second distal end of the multi-sheet is rolled in a second direction which is opposite to the first direction such that the first and second distal ends of the multi-sheet are rolled toward a center of the multi-sheet, respectively.

4. The back beam according to claim 1, wherein the reinforced negative electrode portion includes a hollow hole formed therein in the width direction of the vehicle.

5. The back beam according to claim 1, wherein the reinforced negative electrode portion and the positive electrode portion connected to a switch in which an alternator and an electronic device are connected to the switch in parallel, are selectively electrically-connectable by the switch to the alternator or the electronic device of the vehicle.

6. The back beam according to claim 5,
    wherein, while the reinforced negative electrode portion and the positive electrode portion are electrically connected to the alternator, a charging operation is performed through the solid electrolyte portion, and
    wherein, while the reinforced negative electrode portion and the positive electrode portion are electrically connected to the electronic device, power generated by a discharging operation performed through the solid electrolyte portion is supplied to the electronic device.

7. The back beam according to claim 1, further including:
    a resistive sensor connected to the reinforced negative electrode and the positive electrode to detect a resistance caused by the reinforced negative electrode portion, the positive electrode portion and the solid electrolyte portion,
    wherein a collision of the vehicle is determined to occur based on a change in the resistance detected by the resistive sensor.

* * * * *